US006157288A

United States Patent [19]

Yamaguchi

[11] Patent Number: 6,157,288

[45] Date of Patent: Dec. 5, 2000

[54] CURRENT BREAKING SYSTEM FOR VEHICLE

[75] Inventor: Noboru Yamaguchi, Shizuoka-ken, Japan

[73] Assignee: Yazaki Corporation, Tokyo, Japan

[21] Appl. No.: 09/265,882

[22] Filed: Mar. 11, 1999

[30] Foreign Application Priority Data

| | | | |
|---|---|---|---|
| Mar. 12, 1998 | [JP] | Japan | 10-061796 |
| Jun. 30, 1998 | [JP] | Japan | 10-184744 |

[51] Int. Cl.[7] ........................ H01H 37/76; H01H 85/055; H01H 73/02; B60K 28/14

[52] U.S. Cl. .......................... 337/405; 337/182; 337/401; 337/185; 180/28.3; 361/115

[58] Field of Search .................................... 337/182–185, 337/30, 31, 401–405; 307/9.1–10.8, 119, 120; 180/271, 274, 279, 281–285; 200/61.08, 150 R; 361/115; 280/727

[56] References Cited

U.S. PATENT DOCUMENTS

| | | | |
|---|---|---|---|
| 2,798,921 | 7/1957 | J. W. Haas | 337/163 |
| 3,575,681 | 4/1971 | Nusbaum | 337/1 |
| 3,958,206 | 5/1976 | Klint | 337/406 |
| 4,124,835 | 11/1978 | Cahill, Jr. | 337/1 |
| 4,224,487 | 9/1980 | Simonsen | 200/61.08 |
| 4,311,890 | 1/1982 | Schroder | 200/61.08 |
| 4,821,010 | 4/1989 | Plasko | 337/405 |
| 5,274,349 | 12/1993 | Hassler et al. | 337/171 |
| 5,535,842 | 7/1996 | Richter et al. | 180/279 |
| 5,757,150 | 5/1998 | Kinoshita et al. | 318/139 |
| 5,877,563 | 3/1999 | Krappel et al. | 307/10.1 |

*Primary Examiner*—Gerald Tolin
*Assistant Examiner*—Anatoly Vortman
*Attorney, Agent, or Firm*—Finnegan, Henderson, Farabow, Garrett & Dunner, L.L.P.

[57] ABSTRACT

An current breaking device is interposed between a battery for a vehicle and an electric load. When a circuit cut-off signal is generated from a control unit due to an automobile's collision, the current breaking device allows respective capsules 40 in a power distributing box to be heated to melt a conductive resin plate 2. Therefore, it is possible to stop the power supply from a battery to an electric load.

22 Claims, 9 Drawing Sheets

CURRENT BREAKING SYSTEM FOR VEHICLE

BACKGROUND OF THE INVENTION

1. Field of the Invention

The present invention relates to a current breaking device which detects a condition that a great electric current flows through an electric circuit installed on an automobile or the like and sequentially breaks the electric current for the electric circuit.

2. Description of the Related Art

In an earlier electric installation system, if any malfunction occurs in an electric load, such as a powered window, or in a wire harness constituted by a plurality of electrical wires connecting a battery with respective loads, a fuse for great current interposed between the battery and the wire harness is adapted so as to melt to cut off a connection between the battery and the wire harness. This device prevents the electric loads, the wire harness, and other components from being burned.

In the electric installation system employing the above fuse for great current, however unless the malfunction generates an electric current above a previously established threshold for the fuse, the fuse remains un-molten. Therefore, there have been developed a variety of protection devices each which does detect a condition that a great current close to the allowable current is flowing and cut off the connection between the battery and the wire harness.

SUMMARY OF THE INVENTION

FIG. 1 is a cross sectional view of a protecting device using a bimetal. This protecting device 101 comprises a housing 103 made of insulating resin or the like and having a fuse accommodating part 102 formed on the upper side and a lid 113 adapted so as to close or open the fuse accommodating part 102. The device 101 further includes a power-source terminal 105, a load terminal 109, a soluble body 110, an intermediate terminal 111 and the above-mentioned bimetal 112. The power-source terminal 105 has an exposed portion connected to a positive terminal of a battery 104. The load terminal 109 has an upper portion projecting into the fuse accommodating part 102 and a lower portion positioned in a lower part of the housing 103 and connected to a load 108 through a wire 107 constituting a wire harness 106. The soluble body 110 is made of metal having a low-melting point and disposed in the fuse accommodating part 102, having an end connected to the upper end of the power-source terminal 105 and the other end connected to the upper end of the load terminal 109. The intermediate terminal 111 is arranged at a middle point between the power-source terminal 105 and the load terminal 109 and includes a lower exposed portion disposed in the lower part of the housing 103 and connected to a negative terminal of the battery 104. The bimetal 112 is constituted by an elongated member of two kinds of metals stuck on each other and includes a lower end connected to the upper end of the intermediate terminal 111 and a L-shaped upper portion arranged so as to oppose to the soluble body 110.

On an operation of an ignition switch of a vehicle, the electric current flows in the following route the positive terminal of the battery 104, the power-source terminal 105, the soluble body 110, the negative terminal 109, a wire 107 of the wire harness 106, the load 108 and the negative terminal of the battery 104. If any malfunction is caused in either the load 108 or the wire harness 106 connecting the load 108 with the protecting device 101 so that the current more than the allowable current flows the soluble body 110, then the soluble body 110 is heated to melt thereby to protect the load 108 and the wire harness 106.

Even if the great current flowing through the soluble body 110 does not exceed the allowable current in spite of the malfunction in either the load 108 or the wire harness 106 connecting the load 108 with the protecting device 101, the soluble body 110 is heated due to the great current, so that the bimetal 112 begins to deform. Then, at a point of time that a predetermined period has passed since the great current began to flow through the soluble body 110, the tip of the bimetal 112 comes into contact with the soluble body 110, so that the great short-circuit current flows the soluble body 110 in the following route the positive terminal of the battery 104, the power-source terminal 105, the soluble body 110, the intermediate terminal 111 and the negative terminal of the battery 104. Consequently, the body 110 melts.

That is, even when the current less than the allowable current does flow over a predetermined period, the circuit is cut off to protect the wire harness 106 and the load 108.

Also, besides the above-mentioned protecting device 101, there has been developed a protecting device 121 as shown in FIG. 2.

This protecting device 121 includes a housing 122 made of insulating resin or the like, a power-source terminal 124, a load terminal 128 and an outside terminal 133. The power-source terminal 124 is embedded on the side of one side face of the housing 122 and has a lower end connected to a positive terminal of the battery 123. The load terminal 128 is embedded on the side of the other side face of the housing 122 and has a lower end connected to a load 127 through a wire 126 constituting a wire harness 125. The outside terminal 133 is arranged outside the housing 122 and has an upper end connected to a coil 132 and a lower end connected to a negative terminal of the battery 123.

The device 121 further includes a wire 131 consisting of a U-shaped soluble conductor 129 made of metal having a low-melting point and a heat-resistant cover 130 adapted so as to cover the soluble conductor 129. The wire 131 has one end connected to the upper end of the power-source terminal 124 and the other end connected to the upper end of the load terminal 128. The coil 132 is made from shape memory alloy. The shape memory alloy is established in a manner that when the alloy is in the martensite phase, then the coil 132 winds about the wire 131 with looseness as shown in FIG. 2, while the coil 132 is returned to the mother phase having a configuration to tighten the wire 131 when the coil 132 is heated to 120 to 170 ° C.

On the operation of the ignition switch of the vehicle, the electric current flows in the following route the positive terminal of the battery 123, the power-source terminal 124, the soluble conductor 129 of the wire 131, the negative terminal 128, the wire 126 of the wire harness 125, the load 127 and the negative terminal of the battery 123. If any malfunction is caused in either the load 127 or the wire harness 125 connecting the load 127 with the protecting device 121 so that the current more than the allowable current flows through the soluble conductor 129, then it the soluble conductor 129 is heated to melt thereby protecting the load 127, the wire harness 125, and other components.

Even if the great current flowing through the soluble conductor 129 does not exceed the allowable current in spite of the malfunction in either the load 127 or the wire harness 125 connecting the load 127 with the protecting device 121, the soluble conductor 129 is heated due to the great current, so that the temperature of the coil 132 rises. Then, when a predetermined period has passed since the great current began to flow through the soluble conductor 129, when the temperature of the coil 132 is elevated to a temperature from 120 to 170° C., the coil 132 is brought from the martensite phase to the mother phase. Once in the mother phase, the coil 132 grows into the softened heat-resistant cover 130 for contact with the soluble conductor 129, so that the great short-circuit current flows through the soluble conductor 129 in the following route the positive terminal of the battery 123, the power-source terminal 124, the soluble conductor 129, the coil 132, the outside terminal 133 and the negative terminal of the battery 123. Consequently, the conductor 129 finally melts.

That is, even when the current less than the allowable current does flow over a predetermined period, the circuit is cut off to protect the wire harness 125 and the load 127.

Note, the above-mentioned protecting devices 101, 121 have the following problems.

First, the protecting device 101 of FIG. 1, detects whether the great current flows through the soluble body 110 by using the bimetal 112 of two kinds of metals having different rates of thermal expansion. Therefore, if the magnitude of a current flowing through the soluble body 110 changes, there would be caused a change in time required for the deformed bimetal 112 to cut off the circuit.

Accordingly, when such a malfunction that the great current flows intermittently does occur, then the temperature of the soluble body 110 is not elevated in excess of some degree any longer. As a result wire harness 106, the load 108, or the like may begin to burn before the protecting device 101 operates to cut off the circuit.

On the other hand, the protecting device 121 of FIG. 2, detects whether the great current flows through the soluble conductor 129 by using the coil 132 of shape memory alloy. Therefore, as similar to the protecting device 101 of FIG. 1, if the magnitude of a current flowing through the soluble conductor 129 changes, there would be caused a change in time required for the deformed coil 132 to cut off the circuit.

Accordingly, when such a malfunction that the great current flows intermittently does occur, then the temperature of the soluble conductor 129 is not elevated in excess of some degree any longer. As a result the wire harness 125, the load 127, or the like may be excessively heated before the protecting device 121 operates to cut off the circuit.

It is therefore an object of the present invention to provide a current breaking device which is capable of detecting a possibility that a wire harness, an electric load, or the like is damaged and cutting off an electric circuit installed in the vehicle. Damage might occur from a collision or other trauma to the vehicle. This device prevents the wire harness and other components from overheating due to the resultant short-circuit, thereby improving the safety of the vehicle.

It is an additional object of the present invention to provide a compact current breaking device which allows the device to be easily accommodated in a power distributing box or other container. With this device, circuit recovery is possible by only the partial replacement of the components even after the circuit has been cut off by the previous operation of the current breaking device.

It is the other object of the present invention to provide a current breaking device which is capable of cutting off the circuit in a remarkably short time, certainly when the circuit cut-off signal is inputted, whereby electric load components of the vehicle can be protected.

It is the other object of the present invention to provide a current breaking device which is capable of preventing a residue of a molten member having a low melting point from dispersing.

The above-mentioned objects can be solved by providing a current breaking device interposed between a battery for a vehicle and an electric load of the vehicle, for cutting off a power supply from the battery to the electric load when a circuit cut-off signal is inputted to the current breaking device, the current breaking device comprising:

- a conductive soluble member arranged between the battery and the electric, the conductive soluble member having one end electrically connected to the battery and the other end electrically connected to the electric load; and
- a thermit part attached to the conductive soluble member, the thermit part being capable of generating heat to melt the conductive soluble member when the circuit cut-off signal is inputted to the thermit part, thereby cutting off the electrical connection between the battery and the electric load.

With the above-mentioned arrangement, when there is a possibility that the wire harness, the electric load, or the like is damaged due to, for example, the collision of the vehicle, it is possible to cut off the circuit on detection of the occurrence of damage certainly. Thus, it is possible to prevent the occurrence of vehicle fire due to the short-circuit of the wire harness or other components whereby the safety of the vehicle can be improved remarkably.

In the present invention, preferably, the thermit part comprises:

- a thermit mixture of metal oxide powder and aluminum powder; and
- a heater for generating heat on input of the circuit cut-off signal thereby to cause the thermit mixture to react for its deoxidization, whereby a great quantity of heat can be produced for melting the conductive soluble member.

By using the thermit part, when the circuit cut-off signal is inputted, it is possible to certainly break the circuit in a remarkable short time, so that the electric components can be protected from being damaged.

In the present invention, more preferably, the thermit part further comprises a casing for accommodating the thermit mixture and the heater therein.

In this case, since the thermit mixture and the heater are accommodated in the casing, it is possible to make the current breaking device to be compact, so that the thermit part can be handled easily.

In the present invention, more preferably, the conductive soluble member is provided with a plurality of projections between which the casing of the thermit part is supported.

With the arrangement, it is possible to attach the thermit part to the conductive soluble member with ease.

In the present invention, more preferably, the conductive soluble member is bent like an elbow.

In this case, the whole current breaking device can be constructed to be compact, whereby it is possible to minimize an area that the device occupies in a power distributing box.

Alternatively, the conductive soluble member may be provided with an elongated hole into which the casing of the thermit part is embedded.

Also in this case, owing to the above-mentioned structure, it is possible to make the current breaking device to be compact.

In the present invention, preferably, the conductive soluble member is in the form of a flat plate.

Also in this case, owing to the configuration of the conductive soluble member, it is possible to handle the member with ease.

Alternatively, the casing may be formed so as to envelop a portion of the conductive soluble member being molten by the thermit mixture.

Also in this case, when the circuit cut-off signal is inputted, it is possible to certainly break the circuit in a remarkably short time, so that the electric components can be protected from being damaged. Additionally, it is possible to prevent a residue of the molten conductive soluble member from dispersing.

In the present invention, preferably, the casing is in the form of a cylindrical body through which the conductive soluble member penetrates so as to divide an interior of the casing into an upper part and a lower part.

With the above-mentioned structure, it is possible to connect the thermit part with the conductive soluble member easily.

In the present invention, more preferably, the thermit mixture and the heater of the thermit part are accommodated in the upper part of the casing.

Also in this case, it is possible to receive the residue of the molten conductive soluble member by the lower part of the casing, whereby the dispersion of the residue can be prevented.

In addition, it is also preferable that the conductive soluble member is made of conductive resin.

These and other objects and features of the present invention will become more fully apparent from the following description and appended claims taken in conjunction with the accompany drawing.

DESCRIPTION OF THE PREFERRED EMBODIMENT

Figure 1:
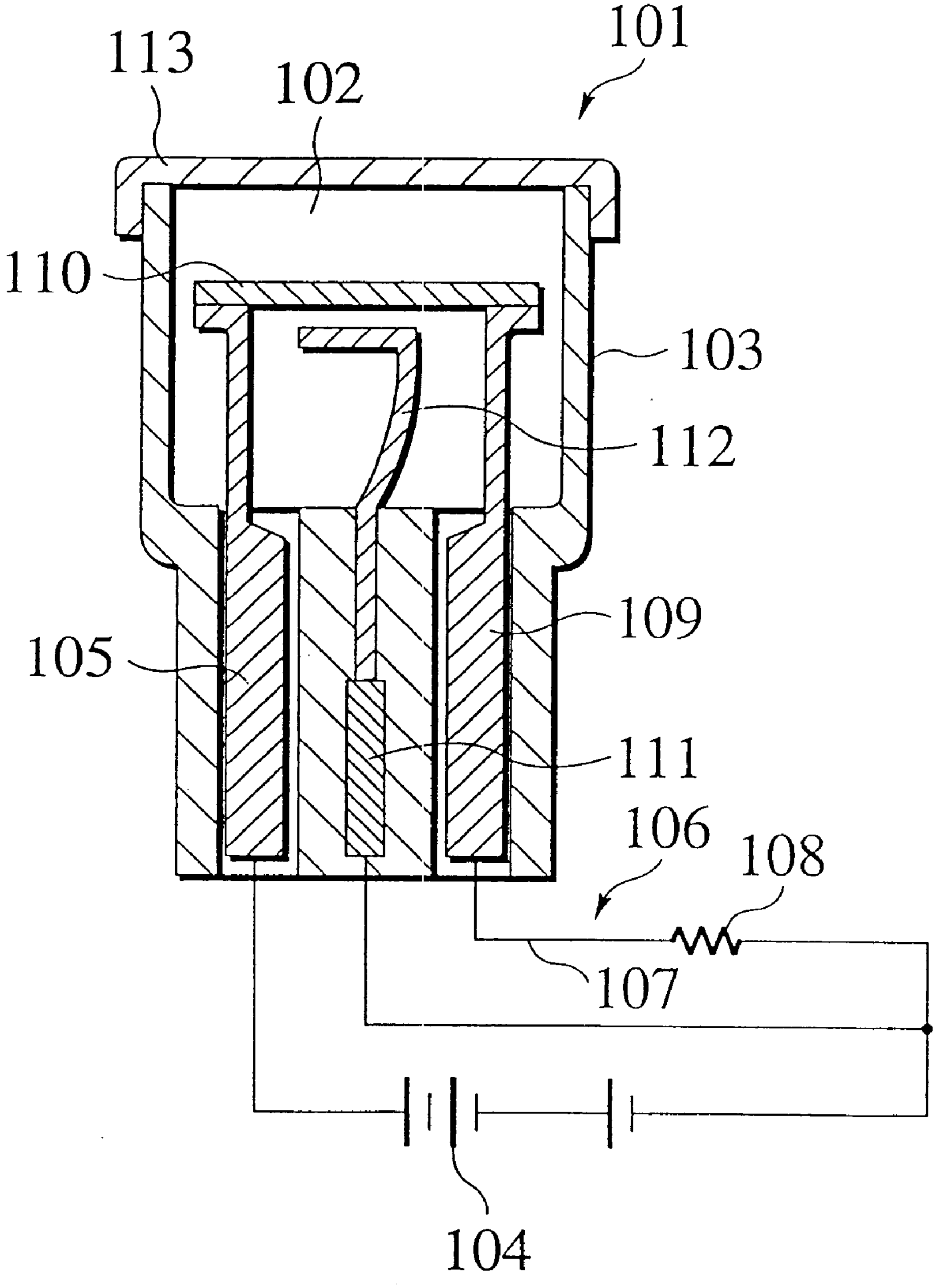
FIG. 1 PRIOR ART
FIG. 1 is a cross sectional view of a protecting device using a bimetal.
Figure 2:
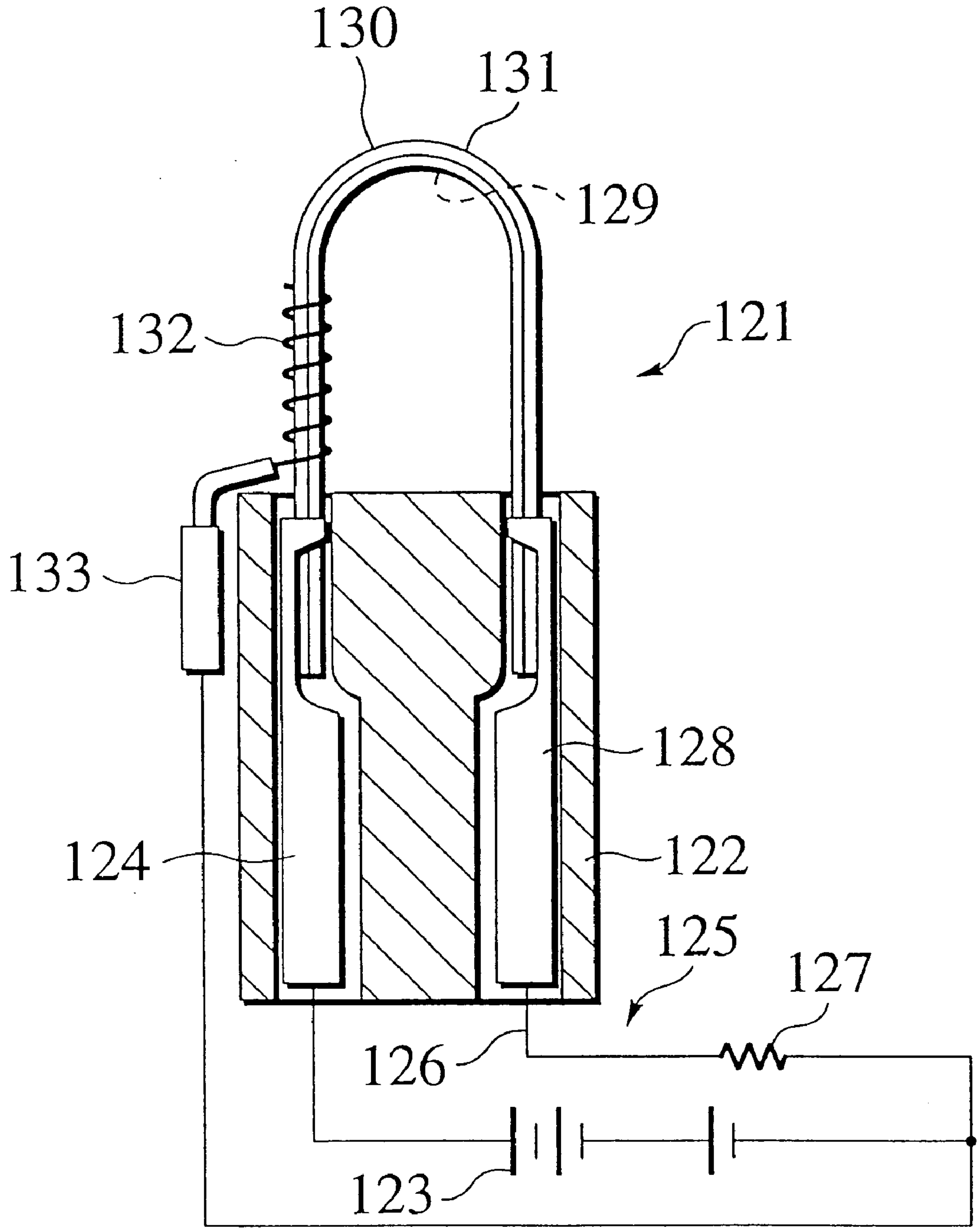
FIG.2 PRIOR ART
FIG. 2 is a cross sectional view of a protecting device using shape memory alloy.
Figure 3:
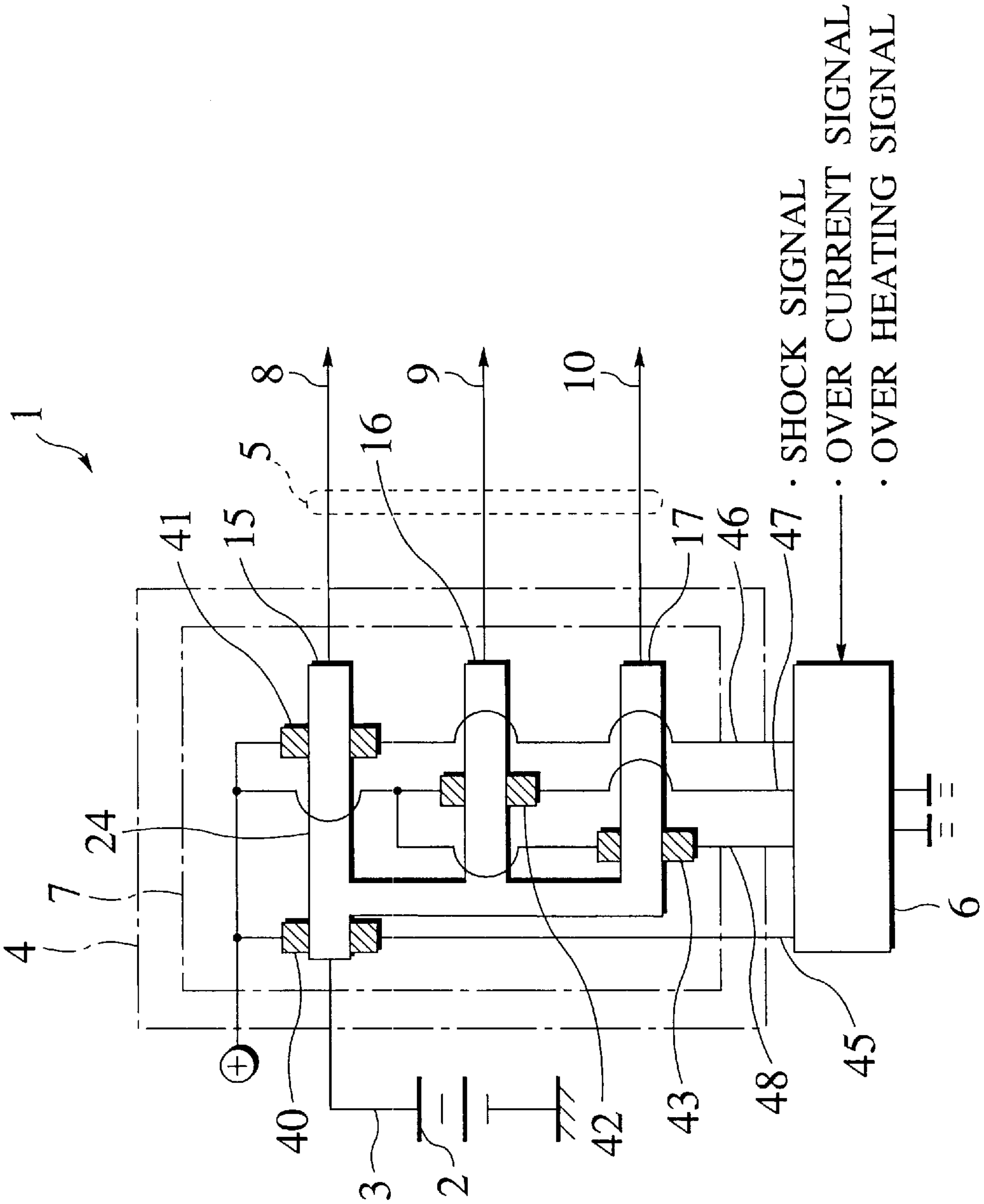
FIG. 3 is a block diagram of an electric installation system using a current breaking device in accordance with an embodiment of the present invention.

FIG. 3 is a block diagram of an electric installation system using a current breaking device in accordance with an embodiment of the present invention.

The electric installation system 1 comprises a battery 2, a power distributing box 4, a control unit 6 and a current breaking device 7. The battery 2 has a negative terminal connected to a vehicle body of an automobile. The power distributing box 4 receives a battery voltage generated from a positive terminal of the battery 2 through a wire 3. When a shock signal is outputted from an acceleration sensor for an air-bag or the like, an overcurrent detection signal is generated from an overcurrent detecting sensor due to an overcurrent condition caused in a wire harness 5 or when an overheating signal is outputted from a temperature sensor for detecting a temperature of an electric load, the control unit 6 does detect such signals to supply a circuit breaking current to the power distributing box 4. The current breaking device 7 is arranged in the power distributing box 4. When no circuit breaking signal is outputted from the control unit 6, the current breaking device 7 does distribute the battery voltage generated from the positive terminal of the battery 2 to respective electrical lines contained in an engine room, a vehicle cabin, a trunk room and so on. However, when the circuit breaking current is generated from the control unit 6, the current breaking device 7 melts in itself and stops to supplying the electricity to the respective electric lines.

On the driver's manipulation of an ignition switch, the current is flowing in the following route the positive terminal of the battery 2, the wire 3, the current breaking device 7, wires 8, 9, 10 constituting the wire harness 5, respective electric loads and the negative terminal of the battery 2 in sequence. When the shock signal is outputted from the acceleration sensor for the air-bag, when the overcurrent detection signal is generated from the overcurrent detecting sensor due to an overcurrent condition caused in the wire harness 5, or when the overheating signal is outputted from a temperature sensor for detecting the temperature of the electric load, then the circuit breaking current is generated from the control unit 6. In this way, the current breaking device 7 in the power distributing box 4 operates to cut off the circuit to the respective electric lines, thereby stopping the battery voltage supply for the wire harness 5 and the electric loads, each of which may be damaged due to the traffic collision.

Figure 4:
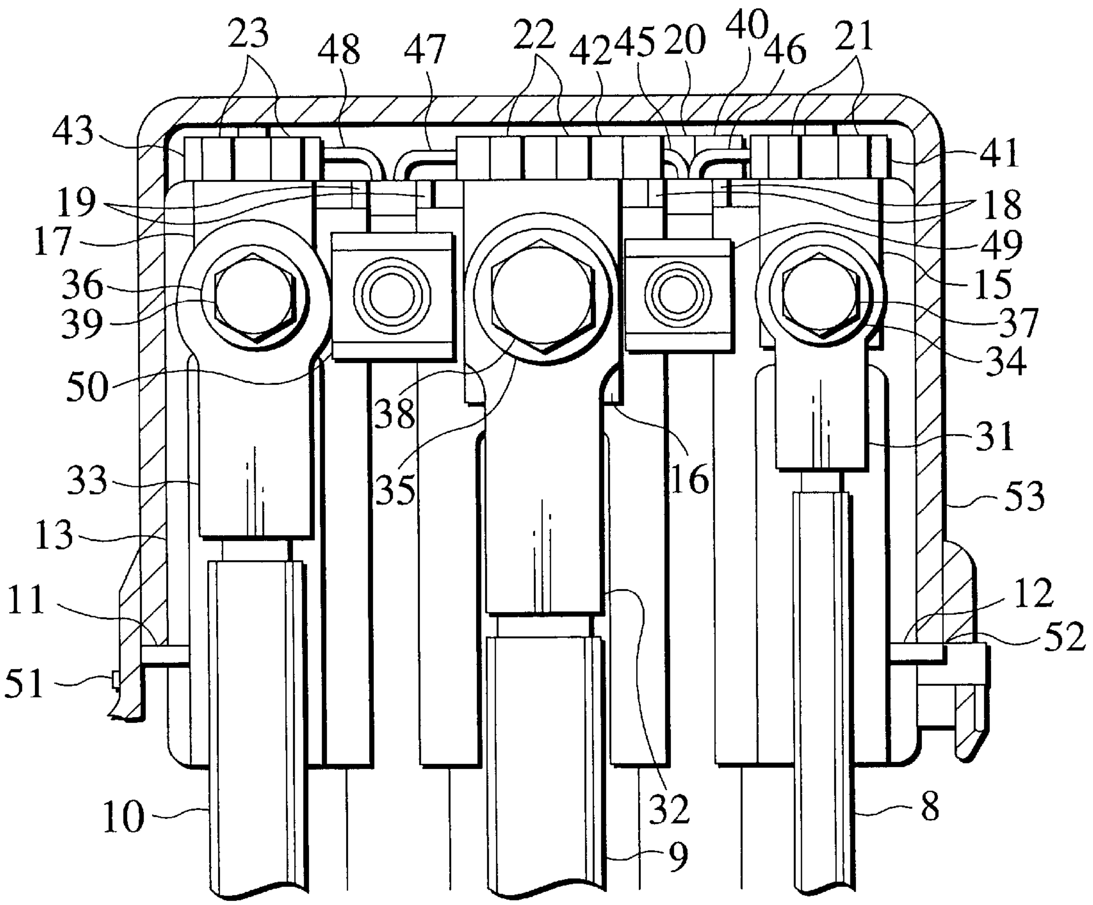
FIG. 4 is a front view with a partial cross section, showing a detailed structure of the current breaking device of FIG. 3.
Figure 5:
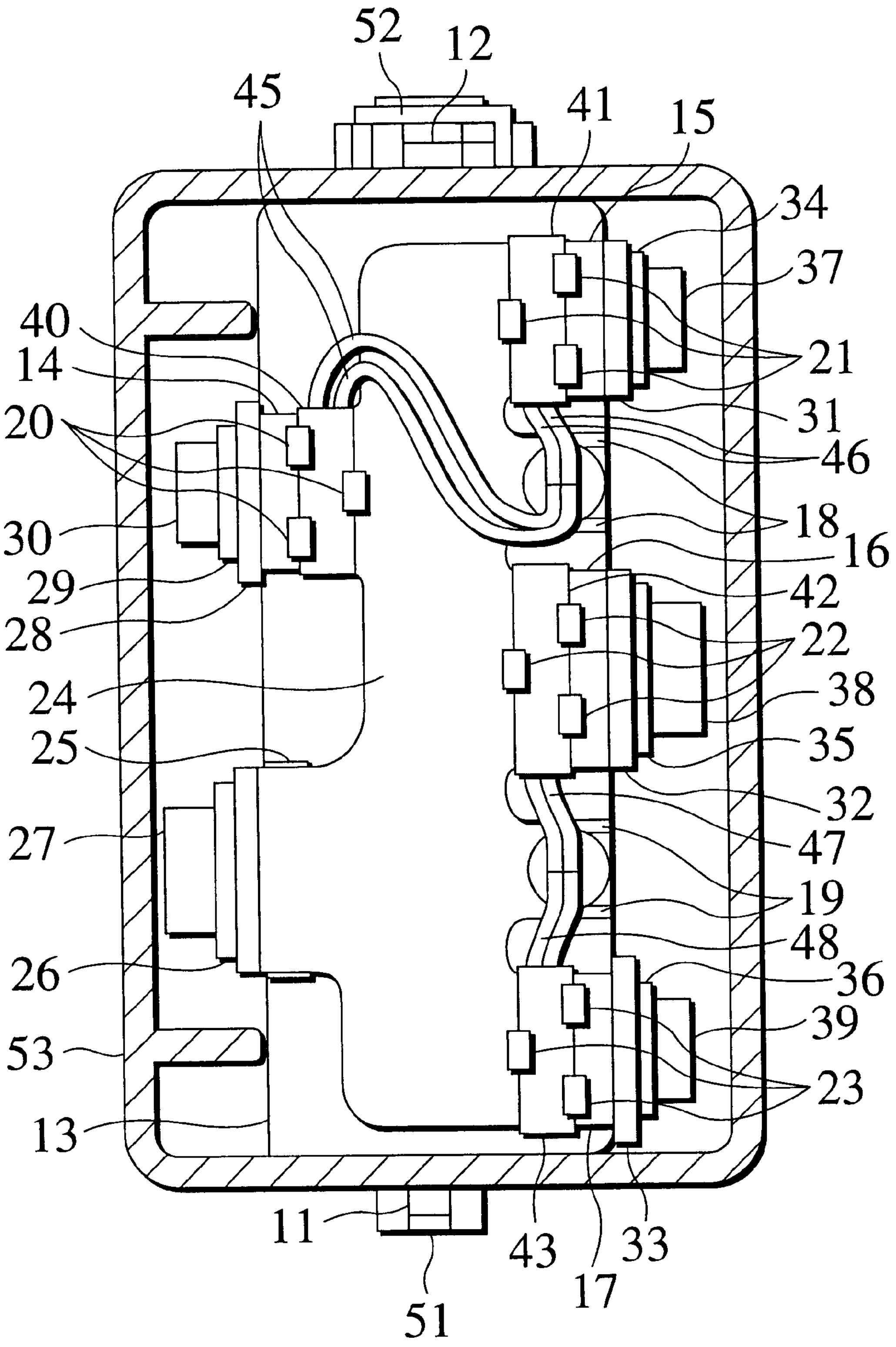
FIG. 5 is a top view with a partial cross section, showing a detailed structure of the current breaking device of FIG. 3.
Figure 6:
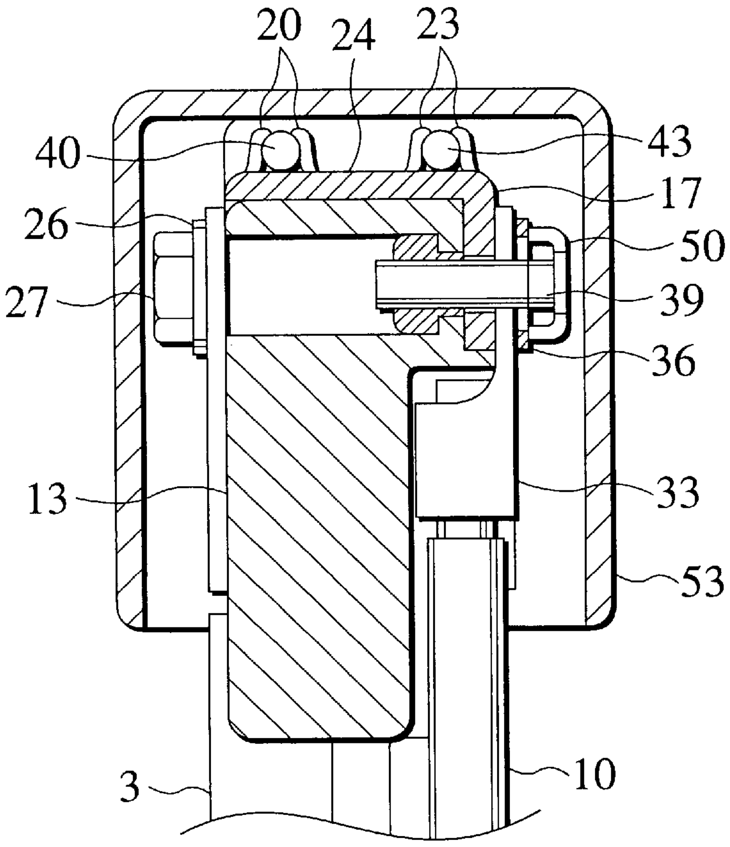
FIG. 6 is a side view with a partial cross section, showing a detailed structure of the current breaking device of FIG. 3.

Next, referring to FIGS. 4, 5 and 6 we describe the above-mentioned current breaking device 7 in detail.

The current breaking device 7 includes a baseplate 13, a conductive resin plate 24, flat washers 26, 29 and bolts 27, 30. The baseplate 13 in the form of a plate of insulating resin is arranged in the power distributing box 4 and also is provided, on opposing side faces thereof, with projections 11, 12. The conductive resin plate 24 is provided by injection molding into resin a conductive composite material of a mixture of short copper fibers, copper powder and soldering power for binding them. As shown in FIGS. 5 and 6, on one side of the plate 24, a fixing terminal 25 and a bus bar 14 constituted by a copper plate are formed in one body. On the other side of the plate 24, three output terminals 15, 16, 17 bending downward and two wire-carrying projections 18, 19 are provided. The so-constructed conductive resin plate 24 is arranged on an upper side of the baseplate 13, provided with capsule-carrying projections 20, 21, 22, 23 in the vicinity of the bus bar 14 and the output terminals 15, 16, 17. The flat washer 26 and the bolt 27 are provided for fixing the fixing terminal 25 of the plate 24 to the baseplate 13. On the other hand, the flat washer 29 and the bolt 30 are provided for fixing a terminal 28 connected to the positive terminal of the battery 2 to the bus bar 14 of the plate 25.

Additionally, as shown in FIG. 4, the current breaking device 7 includes three pairs of flat washers 34, 35, 36 and bolts 37, 38, 39, all of which serve to fix terminals 31, 32, 33 of the wires 8, 9, 10 constituting the wire harness 5 to the output terminals 15, 16, 17 of the conductive resin plate 24, respectively. Respectively inserted into the capsule carrying projections 20, 21, 22, 23 and fixed therein are four capsules 40, 41, 42, 43 which all generate the heat to melt off the conductive resin plate 24 when the circuit cut-off current is generated from the control unit 6. A plurality of wires 45, 46, 47, 48 are inserted into the wire carrying projections 18, 19 in order to supply the circuit cut-off current generated from the control unit 6 to the respective capsules 40, 41, 42, 43, as shown in FIG. 5.

Returning to FIG. 4, the current breaking device 7 further includes two T-shaped nuts 49, 50 fixing the respective wires 45, 46, 47, 48 to the baseplate 13 and a cup-shaped cover 5 having notches 51, 52 formed at the lower end. When the cover 5 is inserted through the top part of the baseplate 13, the notches 51, 52 are engaged with the projections 11, 12 of the baseplate 13, so that the cover 5 is integrated with the baseplate 13.

In operation, the battery voltage supplied via the wire 3 is introduced to the conductive resin plate 24 through the bus bar 14 and sequentially supplied to respective electric lines in the engine room, the vehicle cabin and the trunk room through the output terminals 15, 16, 17 of the resin plate 24, respectively. In such a situation, when the circuit cut-off current is generated from the control unit 6, then the current is introduced to the respective capsules 40, 41, 42, 43 through the wires 45, 46, 47, 48 to heat them. Consequently, due to the so-generated heat, the conductive resin plate 24 is molten to stop the power supply to the above-mentioned electric lines.

Figure 7:
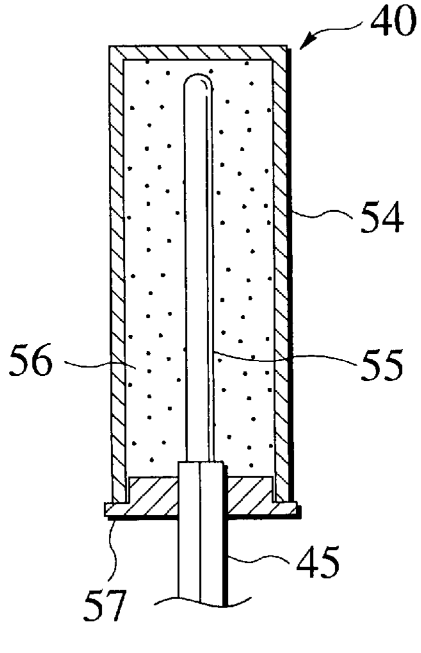
FIG. 7 is a cross sectional view of a capsule shown in FIG. 5.

As representatively shown by the capsule 40 of FIG. 7, each of the capsules 40, 41, 42, 43 comprises a cylindrical casing 54 made of insulating resin, a heater 55 in the casing 54, thermit mixture 56 charged in the casing 54 and a cap 57 for closing an opening of the casing 54. The heater 55 is adapted so as to heat when the circuit cut-off current is supplied through the wire 45 (46, 47, 48). The thermit mixture 56 is composed of powder of metal oxide, such as an iron oxide ($Fe_2O_3$), aluminum powder, or the like. When the heater 55 is heated in excess of a designated temperature by the supply of the circuit cut-off current via the wire 45 (46, 47, 48), then the thermit mixture 56 does generate the thermit reacting heat by the following reacting formula, so that the conductive resin plate 24 is molten off.

$$Fe_2O_3+2Al \rightarrow Al_2O_3+2Fe+386.2\ \text{kcal}$$

According to the embodiment, the soldering power is employed as one material of the conductive resin plate 24. Thus, when the respective capsules 40, 41, 42, 43 generate the heat, the soldering powder is molten at approx. 300° C. and separated from the other materials, so that the conductive resin plate 24 can be easily cut off.

In this way, according to the embodiment, when the shock signal is outputted from the acceleration sensor for the air-bag when the automobile collides with the other vehicle; when the overcurrent detection signal is generated from the overcurrent detecting sensor due to an overcurrent condition caused in the wire harness 5; or when the overheating signal is outputted from a temperature sensor for detecting the temperature of the electric load, the plural capsules 40, 41, 42, 43 in the power distributing box 4 are heated by the circuit cut-off current generated from the control unit 6, to melt the conductive resin plate 24. Thus, since the current breaking device 7 is adapted so as to stop to supplying the electric power to the wire harness 5 and the electric load, each of which might be subjected to damage due to the collision, it is possible to prevent the vehicle fire from occurring due to the short circuit caused in the wire harness 5, whereby the safety can be remarkably improved.

Additionally, according to the embodiment, since the conductive resin plate 24 constituting the current breaking device 7 is shaped like an elbow, the whole current breaking device 7 can be constructed to be compact, whereby it is possible to minimize an area occupied by the device 7 in the power distributing box 4.

According to the embodiment, even if the current breaking device 7 has been operated to melt the conductive resin plate 24 integrated with the bus bar 14, it is possible to recover the circuit by installing only the conductive resin plate 24, the bus bar 14 and the capsules 40–43 to thereby facilitating a restoration of the automobile damaged in a car collision.

Further, it is noted that the embodiment is adapted so as to melt the conductive resin plate 24, which is provided by injection molding the conductive composite material of the short copper fibers, the copper powder and the soldering power for binding them, into the resinous material, at the time of heating the respective capsules 40–43. Therefore, even if the short copper fibers, the copper powder other materials in the plate 24 are molten, it is possible to prevent such a solution from being dispersed to the surroundings because of the resin's enveloping the solution.

In the modification of constituents of the thermit mixture 56, the iron oxide ($Fe_2O_3$) may be replaced with another metal oxide powder, for example chromium oxide ($Cr_2O_3$), manganese oxide ($MnO_2$), or the like.

When adopting the above-mentioned powder, it can be ensured that the thermit mixture 56 in the capsules 40, 41, 42, 43 will react, thereby to melt the resin plate 24 when the circuit cut-off current is supplied through the wires 45, 46, 47, 48.

Figure 8:
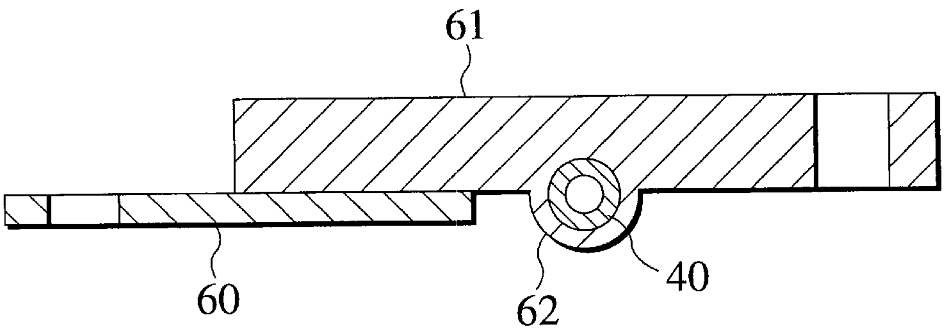
FIG. 8 is a cross sectional view of a conductive resin plate with a capsule, which is used in the current breaking device in accordance with another embodiment of the invention.
Figure 9:
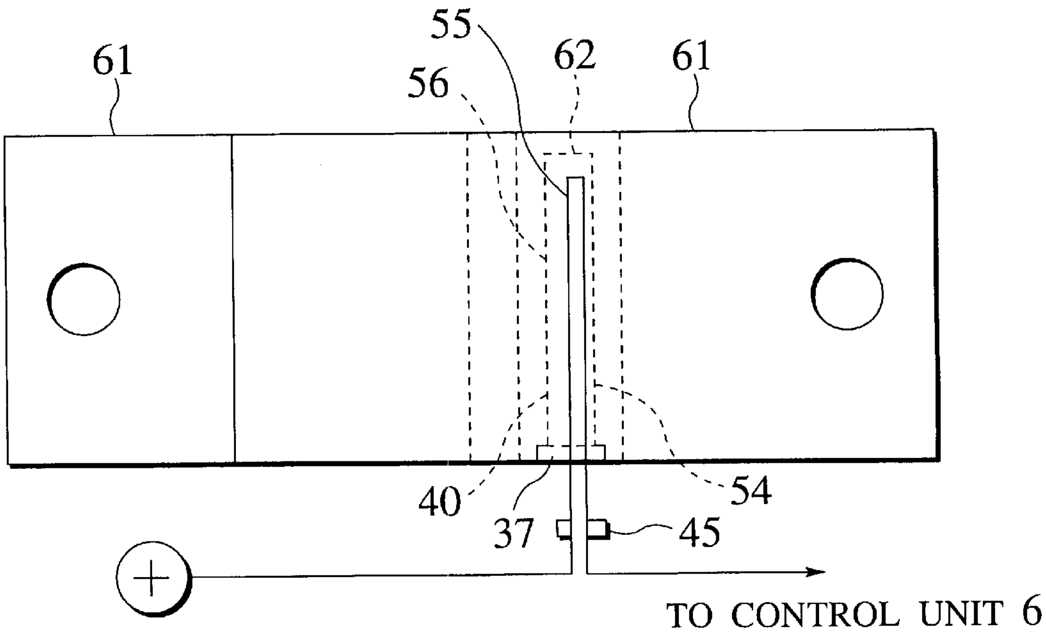
FIG. 9 is a plan view of the conductive resin plate with the capsule of FIG. 8.

It is noted that the respective capsules 40, 41, 42, 43 are respectively attached to the capsule carrying projections 20, 21, 22, 23 on the conductive resin plate 24 in the above-mentioned embodiment. In the modification, as shown in FIGS. 8 and 9, a conductive resin plate 61 may be provided, at an interior thereof, with an elongated hole 62 into which one of the capsules 40, 41, 42, 43, for example, the capsule 40 is embedded. Further, the conductive plate 61 may include a bus bar 60 formed in integral with an end thereof.

Also in this case, when the capsule 40 is heated, the conductive resin plate 24 can be effectively molten.

Figure 10:
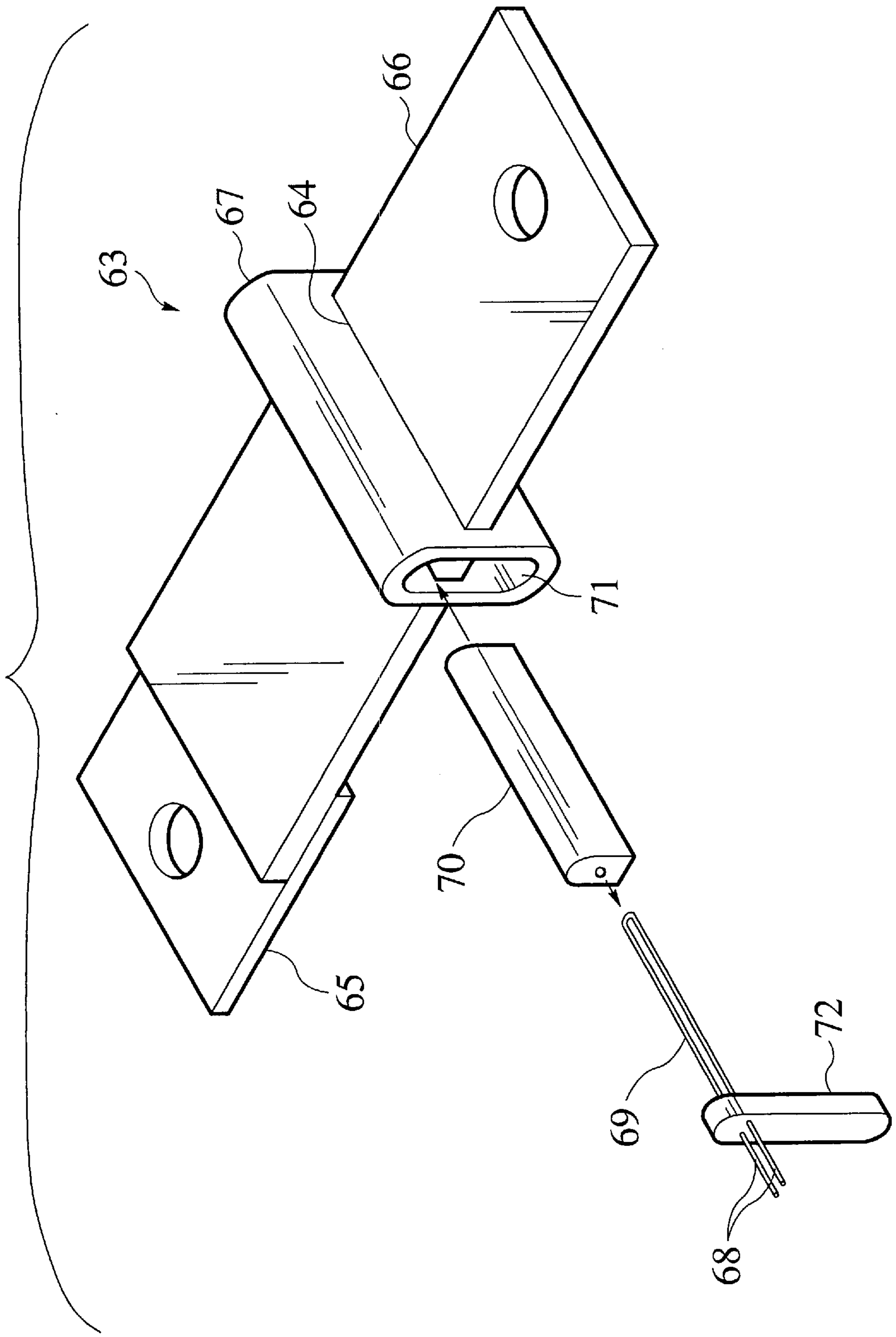
FIG. 10 is a cross sectional view of a conductive resin plate with a capsule, which is used in the current breaking device in accordance with the other embodiment of the invention.

Again, although each of the capsules 40, 41, 42, 43 adopts the structure where the casing 54 filled with the thermit mixture 56 and the heater 55 is closed by the cap 57 in the above-mentioned embodiment, each capsule may be replaced with a capsule 63 as shown in FIG. 10.

Figure 11:
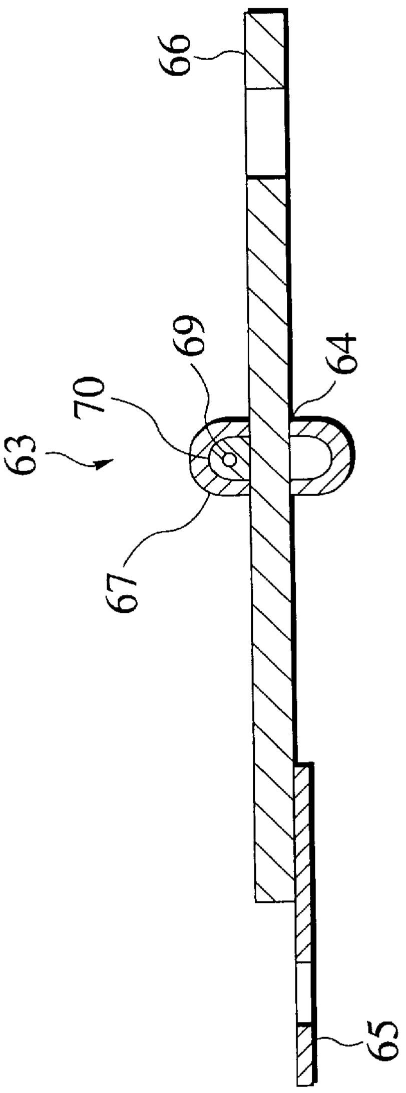
FIG. 11 is a cross sectional view of the conductive resin plate with the capsule of FIG. 10.
Figure 12:
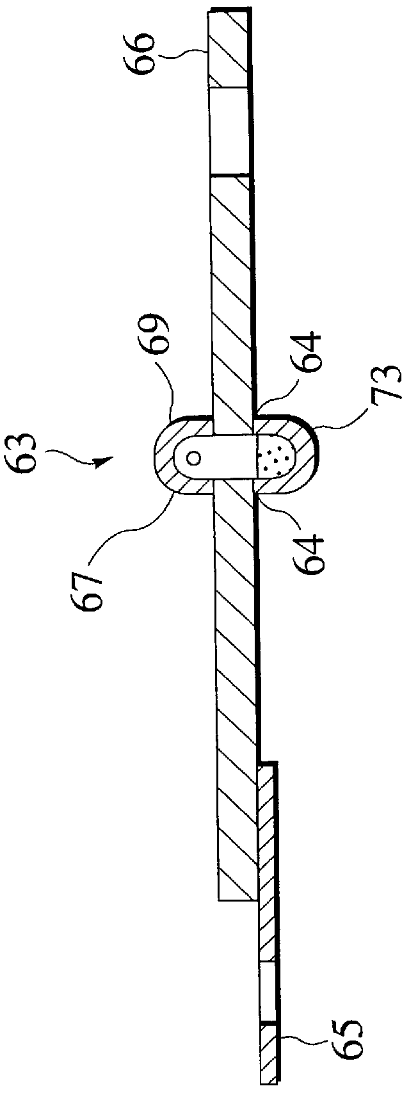
FIG. 12 is a cross sectional view showing a condition that the conductive resin plate is cut off by the capsule of FIG. 10.

The capsule 63 is constituted by a cylindrical member having a cross section elongated up and down (in the vertical direction). The capsule 63 comprises a casing 67 having elongated holes 64 formed on side faces of the casing 67, a heater 69 arranged on an upper side of the casing 67, a thermit mixture 70 accommodated in the casing 67 and a cap 72 for closing an opening 71 of the casing 67. A conductive resin plate 66 in the form of a flat plate is provided with a bus bar 65 and inserted into the elongated holes 64. The heater 69 is adapted so as to generate heat when the circuit cut-off current is supplied to the heater 69 through a wire 68. The thermit mixture 70 is composed of powder of metal oxide, such as an iron oxide ($Fe_2O_3$), aluminum powder, or the like. As shown in FIG. 11, the upper part of the casing 67 is filled up with the thermit mixture 70 as well as the heater 69. When the heater 69 is heated over the designated temperature by the circuit cut-off current supplied through the wire 68, then the thermit mixture 70 causes the thermit reaction to generate the heat for cutting off the conductive resin plate 67. As shown in FIG. 12, after melting the resin plate 66, a residue 73 thereof is carried in the lower part of the capsule 63.

Thus, according to the above-mentioned modification, it is possible to prevent the residue 73, which has been produced in melting the resin plate 66, from dispersing out of the casing 67 of the capsule 63 while absorbing an excessive pressure in the upper part of the casing 67 by the lower part.

Note, as to the configuration of the casing of the capsule, it is not limited to the casing 67 shown in FIG. 10, and any modification is applicable. For example, the casing 67 may be divided into two upper and lower parts, while the conductive resin plate 67 is interposed between the upper part and the lower part. With the arrangement mentioned above, it is possible to perform the same effects as those due to the structure shown in FIG. 10. In addition, it is also possible to simplify the structure itself and the assembling operation.

Finally, it will be understood by those skilled in the art that the foregoing descriptions are some preferred embodiments of the disclosed current breaking device, and that various changes and modifications may be made to the present invention without departing from the spirit and scope thereof.

What is claimed is:

1. A current breaking system comprising:

a current breaking device interposed between a battery for a vehicle and an electric load of a vehicle for cutting off a power supply from the battery to the electric load when a circuit cut-off signal is inputted to the current breaking device, said current breaking device comprising:

a conductive soluble member arranged between the battery and the electric load, said conductive soluble member having one end electrically connected to the battery and the other end electrically connected to the electric load; and a thermit part attached to said conductive soluble member and having a casing for accommodating a thermit mixture and a heater therein, said thermit part generating heat to melt said conductive soluble member when the circuit cut-off signal is inputted to said thermit part, thereby cutting off the electrical connection between the battery and the electric load, wherein said conductive soluble member is bent like an elbow and is provided with a plurality of projections between which said casing of said thermit part is supported.

2. The current breaking system as claimed in claim 1, wherein said casing is formed so as to envelop a portion of said conductive soluble member being molten by said thermit mixture.

3. The current breaking system as claimed in claim 2, wherein said casing is in the form of a cylindrical body through which said conductive soluble member penetrates so as to divide an interior of said casing into an upper part and a lower part.

4. The current breaking system as claimed in claim 3, wherein said thermit mixture and said heater of said thermit part is accommodated in said upper part of said casing.

5. The current breaking system as claimed in claim 4, wherein said conductive soluble member is made of conductive resin.

6. The current breaking system as claimed in claim 1, wherein said electric installation system further comprises a control unit generating the circuit cut-off signal automatically in response to a stimulus within the vehicle.

7. The current breaking system as claimed in claim 6, wherein said control unit generates the circuit cut-off signal in response to an overheating signal generated by a temperature sensor for detecting the temperature of the electric load.

8. The current breaking system as claimed in claim 6, wherein said control unit generates the circuit cut-off signal in response to a shock signal generated by an acceleration sensor for an air bag.

9. The current breaking system as claimed in claim 6, wherein said control unit generates the circuit cut-off signal in response to an overcurrent detection signal generated by a detecting sensor when an overcurrent condition exists in a wire harness.

10. The current breaking system as claimed in claim 1, wherein said thermit part comprises:

a thermit mixture of metal oxide powder and aluminum powder; and a heater for generating heat on the input of the circuit cut-off signal to cause said thermit mixture to react for said thermit mixture's deoxidization, whereby a great quantity of heat can be produced for melting said conductive soluble member.

11. The current breaking system as claimed in claim 1, wherein said conductive soluble member is in the form of a flat plate with said elbow.

12. A current breaking system comprising:

a current breaking device interposed between a battery for a vehicle and an electric load of a vehicle for cutting off a power supply from the battery to the electric load when a circuit cut-off signal is inputted to the current breaking device, said current breaking device comprising:

a conductive soluble member arranged between the battery and the electric load, said conductive soluble member having one end electrically connected to the battery and the other end electrically connected to the electric load; and a thermit part attached to said conductive soluble member and having a casing for accommodating a thermit mixture and a heater therein, said thermit part generating heat to melt said conductive soluble member when the circuit cut-off signal is inputted to said thermit part, thereby cutting off the electrical connection between the battery and the electric load, wherein said conductive soluble member is provided with an elongated hole into which said casing of said thermit part is embedded.

13. The current breaking system as claimed in claim 12, wherein said thermit part comprises:

a thermit mixture of metal oxide powder and aluminum powder; and a heater for generating heat on the input of the circuit cut-off signal to cause said thermit mixture to react for said thermit mixture's deoxidization, whereby a great quantity of heat can be produced for melting said conductive soluble member.

14. The current breaking system as claimed in claim 12, wherein said conductive soluble member is in the form of a flat plate.

15. The current breaking system as claimed in claim 12, wherein said casing is formed so as to envelop a portion of said conductive soluble member being molten by said thermit mixture.

16. The current breaking system as claimed in claim 15, wherein said casing is in the form of a cylindrical body through which said conductive soluble member penetrates so as to divide an interior of said casing into an upper part and a lower part.

17. The current breaking system as claimed in claim 16, wherein said thermit mixture and said heater of said thermit part is accommodated in said upper part of said casing.

18. The current breaking system as claimed in claim 17, wherein said conductive soluble member is made of conductive resin.

19. The current breaking system as claimed in claim 12, wherein said electric installation system further comprises a control unit generating the circuit cut-off signal automatically in response to a stimulus within the vehicle.

20. The current breaking system as claimed in claim 19, wherein said control unit generates the circuit cut-off signal in response to a shock signal generated by an acceleration sensor for an air bag.

21. The current breaking system as claimed in claim 19, wherein said control unit generates the circuit cut-off signal in response to an overcurrent detection signal generated by a detecting sensor when an overcurrent condition exists in a wire harness.

22. The current breaking system as claimed in claim 19, wherein said control unit generates the circuit cut-off signal in response to an overheating signal generated by a temperature sensor for detecting the temperature of the electric load.

* * * * *

UNITED STATES PATENT AND TRADEMARK OFFICE

CERTIFICATE OF CORRECTION

PATENT NO. : 6,157,288
DATED : December 5, 2000
INVENTOR(S) : Noboru Yamaguchi

It is certified that error appears in the above-identified patent and that said Letters Patent is hereby corrected as shown below:

Title page,
Item [57], ABSTRACT, line 5, after "capsules", delete "40"; and
Line 6, after "plate", delete "2".

Signed and Sealed this

Twenty-third Day of April, 2002

*Attest:*

JAMES E. ROGAN
*Director of the United States Patent and Trademark Office*

*Attesting Officer*